United States Patent [19]

Newberg et al.

[11] 3,868,344

[45] Feb. 25, 1975

[54] OIL EXTENDED MOLECULAR WEIGHT CONTROLLED ALFIN GUMS

[75] Inventors: Raymond G. Newberg, Wyoming, Ohio; Fred K. Morgan, Cold Springs, Ky.

[73] Assignee: National Distillers and Chemical Corporation, New York, N.Y.

[22] Filed: Mar. 16, 1973

[21] Appl. No.: 341,803

Related U.S. Application Data

[63] Continuation-in-part of Ser. No. 116,597, Feb. 18, 1971, abandoned, which is a continuation of Ser. No. 4,447, Jan. 20, 1970, abandoned, which is a continuation of Ser. No. 601,266, Nov. 14, 1966, abandoned.

[52] U.S. Cl... 260/33.6 AQ, 260/42.47, 260/94.2 M
[51] Int. Cl............. C08c 11/18, C08c 11/22
[58] Field of Search ............ 260/33.6 AQ, 94.2 M

[56] References Cited
UNITED STATES PATENTS

| | | | |
|---|---|---|---|
| 2,964,083 | 12/1960 | Pfau et al. | 152/330 |
| 3,067,187 | 12/1962 | Greenberg et al. | 260/94.2 M |
| 3,074,902 | 1/1963 | Pfau et al. | 260/33.6 AQ |
| 3,342,238 | 9/1967 | Weinstock et al. | 260/33.6 AQ |
| 3,541,032 | 11/1970 | Pampus et al. | 260/33.6 AQ |

OTHER PUBLICATIONS

Hansley et al., Rubber Age, vol. 94, No. 1, pages 87–92 (October 1963).

*Primary Examiner*—Donald E. Czaja
*Assistant Examiner*—H. H. Fletcher
*Attorney, Agent, or Firm*—Allen A. Meyer, Jr.

[57] ABSTRACT

Rubber compositions are prepared from blends of an alfin catalyzed molecular weight controlled rubber polymer containing a conjugated diolefin having a Mooney viscosity (ML 1+4 100°C.) of less than about 80 and at least 30 parts per 100 parts of rubber polymer of a hydrocarbon oil having a boiling point above about (232°C.). The compositions, when blended with carbon black are useful in the manufacture of pneumatic tires.

11 Claims, No Drawings

OIL EXTENDED MOLECULAR WEIGHT CONTROLLED ALFIN GUMS

BACKGROUND OF THE INVENTION

This application is a continuation-in-part of application Ser. No. 116,597, filed Feb. 18, 1971, now abandoned, which application is a continuation of application Ser. No. 4,447, filed Jan. 29, 1970, now abandoned, which application is a continuation of application Ser. No. 601,266, filed Nov. 14, 1966, now abandoned.

The present invention relates to the manufacture of improved rubbery products for general use in rubber products of all kinds. The primary use for the rubber products of this invention is in pneumatic tires for all types of land, sea and air vehicles. More particularly, the invention relates to preparing oil-extended alfin rubbers from alfin rubbers having controlled Mooney values and molecular weights and to the oil-extended products produced thereby.

Synthetic rubbers and polymers prepared by polymerizing olefins and diolefins in the presence of alfin catalysts have been known for many years. These so-called alfin-rubbers are described in an article by A. A. Morton, their discoverer, in "Industrial and Engineering Chemistry," Vol. 42, page 1488 (1950), and to the rubber industry have meant essentially high molecular weight products in the range of 5 to 10 million molecular weight, and even higher, which were produced by alfin catalysts. Although these polymers possess many desirable properties, they are exceedingly difficult, if not impossible, to process on existing machinery under standard processing conditions.

Attempts have been made to put oil extenders in alfin rubber gums in which the molecular weight was not controlled in an effort to improve the processibility of such gums. These efforts have been largely unsuccessful because of the great difficulty and expense required to work oil into gums of such high molecular weight.

It has been proposed to add oil to a polymerization reaction medium prior to polymerization in the presence of an alfin catalyst as a method of oil-extending alfin gums of uncontrolled molecular weight. Such a process is described in U.S. Pat. No. 3,074,902 wherein it is proposed to add oil during polymerization to alfin catalyzed rubber polymers having a Mooney viscosity above 85 and preferable above about 115. This patent suggests that no benefit would be obtained by oil extending a rubber polymer having a Mooney viscosity of less than 85. The process described in U.S. Pat. No. 3,074,902 is economically unattractive because the extending oil, when added during polymerization, attacks the alfin catalyst thus requiring the presence of excessive amounts of catalyst.

Recently, it has been found possible to control the molecular weight of alfin catalyzed diene polymers. In U.S. Pat. No. 3,067,187, various dihydro derivatives of aromatic compounds were employed in alfin catalyst polymerizations to produce useful rubbers having molecular weights in the range of about 50,000 to about 1,250,000 from butadiene, isoprene, styrene, piperylene and varying combinations of two or more of these. The microstructures of such molecular weight controlled alfin polymers remain substantially the same as those of alfin polymers in which the molecular weight was not controlled. Alfin polymers have been found to have from 65 to 75 percent trans-1,4 units and from about 20 to 35 percent vinyl units with little or no cis-1,4 units.

U.S. Pat. No. 3,067,187 discloses the usefulness if molecular weight controlled alfin rubbers and, in example 36, a recipe for typical tire tread stock using such alfin rubber is given. This recipe includes a small amount, 3 parts per 100 parts of alfin polymers, of oil as a plasticizer. It is conventional practice in the rubber industry to add small amounts, i.e., up to 15 parts per 100 parts of rubbers, of oil or other plasticizer to low Mooney viscosity rubber during compounding as disclosed in U.S. Pat. No. 2,964,083. Neither U.S. Pat. No. 3,067,187 or U.S. Pat. No. 2,964,083 suggests that any benefit can be obtained by adding 30 parts or more oil to rubber polymers having a Mooney viscosity below 85 and indeed U.S. Pat. No. 2,964,083 shows in FIG. 3 that there is a loss in physical properties when more than 30 parts of oil are added to rubbers having a Mooney viscosity of 85 or less.

SUMMARY OF THE INVENTION

This invention concerns the novel products obtained by incorporating large amounts of oil, i.e. more than 30 parts per 100 parts of rubber, into certain of the molecular weight controlled alfin rubber polymers described in U.S. Pat. No. 3,067,187. It has been discovered that molecular weight controlled alfin gums having a Mooney viscosity of about 30 to about 80 can be blended with large amounts of oil and carbon black to produce novel rubber products having new and unusual characteristics and properties including improved "green strength" which were heretofore unknown for low Mooney viscosity synthetic rubbers. The molecular weight controlled alfin gums of having incorporated therein large amounts of selected oils as extenders have been found surprisingly to produce oil extended rubbers which retain the properties of the gum rubbers themselves. For example, the S-value computed back to standard compound as described in U.S. Pat. No. 2,964,083 remains relatively constant for the oil extended molecular weight controlled alfin rubbers of the present invention. This unusual advantage has been found even when the raw gum alfin rubber has been diluted with up to 100 parts of oil per 100 parts of rubber.

One of the most important properties exhibited by the novel rubber compositions of this invention is high "green strength" which refers to the uncured rubber compositions' ability to develop tensile modulus properties in the uncured state and to retain its shape after extrusion, fabricating, molding or the like. This property, sometimes referred to as resistance to cold flow, is extremely important in the manufacture of tires where tire treads are extruded from uncured rubber compositions and fitted on a tire carcass before curing. Until the tire product is cured, it is imperative that the uncured tire treads retain their exact shape.

Heretofore, synthetic rubbers such as conventional SBR rubbers were lacking in green strength. Only natural rubber exhibited a satisfactory green strength. The novel rubber compositions of the present invention have been found to possess green strength properties as good as, and in some cases, better than natural rubber.

DESCRIPTION OF THE INVENTION

The process for preparing the alfin gum rubbers to be oil-extended in accordance with the present invention, i.e., alfin gums having controlled molecular weights of from about 200,000 to about 750,000 and a Mooney viscosity of from about 30 to about 80, is generally described in U.S. Pat. No. 3,067,187. This process involves polymerizing suitable monomer or monomers in the presence of an alfin catalyst, a molecular weight control agent and an inert hydrocarbon diluent. Examples of suitable hydrocarbon diluents include pentane, hexane, cyclohexane, decalin, heptane and mixtures thereof, with higher boiling solvents being preferred. Particularly good results have been obtained with substantially pure branched chain aliphatic hydrocarbons, since alfin catalyst activities are greater in the presence of such materials as compared to catalyst activities in normal chain aliphatic hydrocarbons.

The practice of this invention is particularly well adapted for use with polymers and copolymers prepared by the polymerization of conjugated diolefinic compounds having no more than 12 carbon atoms, e.g., 1,3-butadiene or isoprene, and to the copolymerization of such a diolefinic compound with another diolefin compound or with other polymerizable monomers, such as, styrene. In general, aliphatic conjugated dienes of four to 12 carbon atoms are preferred for rubber products. The other monomeric materials which may be polymerized include, for example, other butadienes, such as 2,3-dimethyl-1,3-butadiene, piperylene, 3-furyl-1,3-butadiene, 3-methoxy-1,3-butadiene, and the like, aryl olefins, such as, styrene, various alkyl styrene, p-methoxystyrene, alpha-methyl-styrene, vinylnaphthalene, and similar derivatives, and the like; vinyl cyclobutane, vinyl cyclopentane and other unsaturated hydrocarbons. Particularly useful polymers and copolymers include polymers of 1,3-butadiene and copolymers of 1,3-butadiene with styrene and isoprene.

In copolymers used for tire treads the total proportion of butadiene and/or other conjugated diolefinic compounds is ordinarily at least 50 percent of the weight of the copolymer. However, it is possible to prepare a useful rubbery material containing as much as 85 percent by weight of mono-olefinic compounds, such as, styrene copolymerized with 15 percent of butadiene or other conjugated diolefinic compound.

The polymerization or copolymerization reaction takes place in the presence of an alfin catalyst, that is, an intimate mixture of a sodium alkenyl compound, a sodium alkoxide, and an alkali metal halide, such as, for example, a mixture of sodium isopropoxide, allyl sodium, and sodium chloride. The preparation of such alfin catalysts is described in U.S. Pat. No. 3,067,187. In general, alfin catalysts are prepared by (1) reacting amyl chloride with sodium and subsequently (2) reacting the product of (1) with a methyl alkyl carbinol and an olefin.

The molecular weights of polymers prepared in the presence of an alfin catalyst can be controlled, as disclosed in U.S. Pat. No. 3,067,187 when certain molecular weight control agents or, more specifically, certain dihydro derivatives of aromatic hydrocarbons are present during polymerization. These alfin-catalyzed polymerizations give final products having high elastomer content but low intrinsic viscosity.

The dihydro derivatives of aromatic hydrocarbons disclosed in U.S. Pat. No. 3,067,187 as being useful as molecular weight control agents include 1,4-dihydrobenzene, 1,4-dihydronaphthalene, 1,2-dihydrobenzene, dihydrotoluene, dihydroxylene, and the like, and mixtures of these, with 1,4-dihydrobenzene and 1,4-dihydronaphthalene being preferred. Of course, for purposes of the present invention, the type of agent and the amounts used should be selected so that alfin rubbers having molecular weights in the range of about 200,000 to about 750,000 and Mooney viscosities within the range of about 30 to about 80 are produced. It is to be understood, however, that the use of any particular compound as the molecular weight control agent for alfin rubber is not an essential feature of this invention, except insofar as an alfin rubber product is produced having a measured Mooney viscosity value of about 30 to about 80.

The amount of molecular weight control agent required for a given molecular weight or Mooney viscosity value is dependent upon, in addition to the type of agent, such factors as the temperature and pressure of the reaction and the quantity and type of diluents employed. In general, the amount of molecular weight control agent used may vary from about 1 to about 80 percent, based on the weight of the monomer; the usual amount being within the range of about 1.5 to about 6 percent.

In accordance with the process of the present invention an alfin rubber polymer having a Mooney viscosity of about 30 to about 80 is prepared by reacting a suitable polymerizable monomeric material at least a portion of which is a conjugated diolefin in the presence of an alfin catalyst, an inert hydrocarbon diluent and a suitable molecular weight control agent. After the polymerization reaction is substantially complete and before removal of the inert hydrocarbon diluent, the product mixture normally contains a rubber solids concentration of about 1 to about 30 percent by weight. This point in the process is referred to as the "cement stage." It is while the alfin rubber product mixture is in this stage that an oily liquid hydrocarbon extender which is compatible with the rubber polymer is added to the product mixture in accordance with this invention.

The extending oil may be added to the rubber product mixtures in any convenient manner. For example, the product mixture can be pumped into a stirred tank and the oil poured into the product mixture while stirring. The combination of oil and "cement stage" alfin rubber product should be stirred until the oil is thoroughly homogenized with the alfin rubber.

After the oil has been thoroughly blended into the alfin rubber product mixture the hydrocarbon diluent is removed in a suitable diluent recovery operation and solid oil-extended alfin rubber polymer is obtained.

Several advantages are obtained by adding the extending oil to the alfin rubber polymer while the polymer is in the cement stage. One advantage is the ease with which the oil may be worked into the alfin rubber polymer when it is in the cement stage, i.e., the oil is merely stirred in when added during the cement stage. If the oil were added to solid alfin rubber polymer, the use of a Banbury mixer or a rubber processing mill would be required as well as longer mixing times. Other advantages in adding the oil to the cement stage are that greater homogeneity of the oil and alfin rubber polymer is obtained, and the polymer suffers no degradation by excessive mastication as in Banbury or mill blending.

It has also been found that by adding the oil during the cement stage, i.e., right after completion of the alfin rubber polymerization, the oil serves to deactivate or kill any residual catalyst present, thus obtaining the necessity of a catalyst deactivation step.

In accordance with the present invention, from about 30 parts up to about 150 parts of oil per 100 parts of molecular weight controlled alfin polymer may be added to extend said polymer. For tire tread stock, a practical upper limit is about 80–100 parts of oil per 100 parts of rubber. When too much oil is added to the alfin rubber polymer, the desirable physical properties of the polymer will be destroyed.

The Mooney viscosity of oil extended molecular weight controlled alfin polymer compositions when compounded with at least 50 parts of carbon black (compounded Mooney) must be below about 60 to be used without great difficulty in extrusion operation or the like. For example, the rubber polymer composition must have a Mooney viscosity below about 60 to be sufficiently soft or plastic to produce extruded tire treads of uniform section. Also, molecular weight controlled alfin rubber compositions having a compounded Mooney viscosity over 60 tend to overheat and scorch when extruded.

The Mooney viscosity of the raw gum molecular weight controlled alfin polymers should be about 30 to about 80. When the molecular weight controlled alfin polymers have a Mooney viscosity below about 30, it is impossible to add 30 or more parts of oil to 100 parts of the polymer and still retain the desirable physical properties of the rubber polymer. For example, the oil extended rubber polymer becomes too soft and plastic and does not hold a shape when extruded or molded. Also, the oil extended rubber polymers do not wear well when used in tires.

When the Mooney viscosity of the molecular weight alfin rubber polymer is above about 80, we have found that it is often difficult to obtain a compounded Mooney of less than 60 without adding so much oil that the desirable physical properties of the alfin rubber polymer are destroyed. In addition, it becomes difficult to add the oil to the rubber polymer on a rubber blending mill when the Mooney viscosity of the polymer is more than about 80.

Many suitable extender oils are commercially available today for use with commercial gums such as SBR and the newer synthetic rubbers, such as the stereo specific polymers cis-polybutadiene or cis-polyisoprene. In general, all of these oils are applicable and use for oil extending molecular weight controlled alfin gums. Preferably, the extender is an oily liquid hydrocarbon such as a mineral oil having a boiling point well above the temperatures to be encountered in use. For ordinary uses, the extender oils should not boil below about 232°C and preferably should not boil below about 288° to 316°C.

The following are examples of various types of oily liquid hydrocarbon extenders showing identifying data, tradenames and manufacturers or suppliers.

TABLE I

| OIL | MANUFACTURER | Compositions %Ca | %Cn | %Cp | Specific Gravity | Pour Point (°C) | Flash Point (°C) | Aniline Point (°C) | Initial Boiling Point(°C) |
|---|---|---|---|---|---|---|---|---|---|
| Sundex 790 | Sun Oil Company | 34 | 32 | 34 | 0.979 | +10 | 213 | 47 | — |
| Sundex 890 | do. | 48 | 8 | 44 | 1.014 | +10 | 213 | 34.4 | — |
| Sundex 8125 | do. | 40 | 26 | 34 | 0.997 | +10 | 227 | 46 | — |
| Circosol 380 | do. | 14 | 41 | 45 | 0.928 | −20.5 | 202 | 81.7 | — |
| Circo Light Rubber Proccess Oil | do. | 20 | 39 | 41 | 0.922 | −40 | 165.5 | 69.5 | — |
| Dutrex 1726 | Shell Oil Company | 39 | 23 | 38 | 0.9806 | +18.3 | 227 | 40.5 | 418 |
| Dutrex 726 | do. | 41 | 24 | 35 | 0.9895 | +15.5 | 218 | 40.5 | 355.5 |
| Philrich - 5 | Phillips Petroleum Company | — | — | — | 0.9930 | +12.8 | 249 | 43.3 | — |
| Califlux - GP | Golden Bear Oil Corp. | — | — | — | 1.01 | +7.2 | — | — | 351.5 |

\* Ca - carbon atoms tied up in aromatic structures
Cn - carbon atoms tied up in naphthenic structures
Cp - carbon atoms tied up in paruffinic structures If desired, in addition to extending oil, other compounding ingredients such as carbon black, zinc oxide, stearic acid, sulfur, accelerators and the like may be added to the alfin rubber polymer while it is in the cement stage. After removl of the hydrocarbon diluent, a rubber product is obtained which is ready for vulcanizing, thus by-passing the usual milling and mixing steps.

In the production of alfin rubber formulations for use in tire treads, any of the conventional carbon blacks may be incorporated either in the cement stage or in the oil extended alfin rubber product after removal of the diluent. While any of the carbon blacks, including the furnace blacks, channel black, and even thermatomic, can be used to obtain compounds suitable for many purposes, the fine reinforcing furnace blacks generally have properties which are superior to others. Examples of furnace blacks useful in alfin rubber formulations for tire threads include, for example, the following high abrasion furnace black (HAF) and intermediate super abrasion furnace black (ISAF):

TABLE II

| Tradename | Manufacturer | Type | Particle Size Millimicrons | Surface Area sq. meters/gm. |
|---|---|---|---|---|
| Vulcan 6 | Cabot Corp. | ISAF | 23 | 115 |
| Vulcan 3 | do. | HAF | 29 | 75 |
| Statex 125-H | Columbian Carbon | ISAF | — | — |

In addition to carbon black, other fillers, pigments and additives may be compounded into the molecular weight controlled alfin rubber, such as, for example, kaolin clays, Whiting (CaCO$_3$), Lithopone (30% ZnS$_2$ and 70% BaSO$_4$), Dolomite (CaCO$_3$ & MgCO$_3$), zinc oxide, titanium dioxide, "Hysil" (silicon dioxide) and the like. Carbon black and/or other fillers and pigments may be added in amounts as high as 80 parts or higher per 100 parts of alfin rubber and still obtain useful products.

In tire tread formulations, the amount of carbon black used is normally about 30 to 35 percent to 60 or even 65 percent based on the total amount of oil-extended alfin rubber present in the compound. Other amounts are also useful. Preferably, a tire tread stock should contain from 50 to 150 parts of carbon black per 100 parts of rubber polymer present. Other pigments and fillers may be substituted for part of the carbon black.

More detailed practice of the invention is illustrated by the following examples wherein parts are given by weight unless otherwise specified. These examples and embodiments are illustrative only, and the invention is not intended to be limited thereto except as indicated by the appended claims. The alfin catalyst used in the following examples was prepared in accordance with the procedure described in U.S. Pat. application Ser. No. 271,487 filed Apr. 8, 1963, now U.S. Pat. No. 3,317,437. Mooney viscosity values in the examples were determined by the ASTM D 1646-61 standard test.

EXAMPLE I

A. 80/20 Butadiene-Isoprene copolymer 50 ML 1+4 (100°C.)

In a continuous process, operating under steady state conditions at a temperature of 45°C., the following feeds are led into a stirred reactor:

1) Hexane — one gal./hr.
2) Butadiene — 0.56 lb./hr.
3) Isoprene — 0.14 lb./hr.
4) Alfin Catalyst — 0.21 lb./hr.
5) Nitrogen — Sufficient to blanket system
6) Molecular Weight Control Agent (1,4-dihydronaphthalene) — 0.002 lb./hr. feed Heat is removed by means of water jacketing on the polymerization kettle and the system is of such a size to allow residence time in the reaction zone of about 3.5 hours. Conversion at the outlet or overflow from the system is 95 percent and the product at the 9–10 percent gum level is viscous but can readily be pumped through piping of standard size for such equipment. At this point, the Mooney viscosity ML 1+4 (100°C.) of the gum in a dry form is 50 ± 2 and a molecular weight of 300,000.

From this polymerization section, the cement is run into a second section where extending oil (Sundex 890) is mixed into the cement in the ratio of varying parts of oil per 100 parts of gum using the actual determined conversion value of monomers to polymers. These varying values are the oil to gum ratios shown in part 1 of Table III.

After incorporation of the oil, the cement is run to a crumb former section where it is washed with water to remove alkali salts and steamed to the consistency of a coarse wet crumb with the assistance of a surface active agent (TAMOL), with the simultaneous removal of the hexane solvent as the water azeotrope.

The coarse crumb is freed of water in a Banbury mill at a final temperature of 148.9°C. The gum is finished on a roll mill into sheet form at about 104.4°C. Ash value is less than 0.4 percent; volatiles less than 0.5 percent.

B. 80/20 Butadiene Isoprene Copolymer 80 ML 1+4 (100°C.).

In an exactly similar process except that the 1,4-dihydronaphthalene was adjusted to 0.001 lbs. per hour feed instead of the 0.002 lbs. 1 hr. value used above to reach 50 Mooney, keeping all other feeds the same. The data obtained with respect to these samples is shown in part 2 of Table III. Isolated gum had a volatiles content of less than 0.4 percent, ash less than 0.5 percent. The polymer had a Mooney viscosity ML 1+4 (100°C.) of 80 ± 2 before oil extension and a molecular weight of 400,000.

TABLE III

RELATIONSHIPS OF COMPOUND MOONEY TO VARIATIONS IN CARBON AND OIL IN TREAD COMPOSITIONS ON ALFIN GUMS (BUTADIENE-ISOPRENE COPOLYMERS)

| A. | | 80/20 Butadiene-Isoprene Copolymer 50 ML1+4 (100°C.) | | |
|---|---|---|---|---|
| | Rubber (parts) | *Carbon (parts) | **Oil (parts) | Final Mooney ML1+4/100°C. |
| 1 | 100 | 60 | 30 | 41.0–42.0 |
| 2 | 100 | 70 | 40 | 44.0–44.5 |
| 3 | 100 | 80 | 40 | 51.0–51.0 |
| 4 | 100 | 70 | 55 | 31.0–31.5 |
| 5 | 100 | 85 | 60 | 35.0–35.5 |
| 6 | 100 | 100 | 60 | 45.5–46.5 |
| 7 | 100 | 95 | 75 | 30.5–31.0 |
| 8 | 100 | 120 | 70 | 52.0–52.0 |
| 9 | 100 | 120 | 80 | 46.0–45.5 |
| B. | | 80/20 Butadiene Isoprene Copolymer 80 ML1+4 (100°C.) | | |
| 1 | 100 | 75 | 50 | 49.0–48.5 |
| 2 | 100 | 75 | 75 | 32.0–32.5 |
| 3 | 100 | 85 | 75 | 43.0–43.0 |
| 4 | 100 | 110 | 60 | 73.5–73.0 |
| 5 | 100 | 100 | 75 | 49.5–52.0 |
| 6 | 100 | 120 | 80 | 60.0–60.0 |
| 7 | 100 | 110 | 90 | 30.0–30.0 |
| 8 | 100 | 100 | 100 | 40.5–41.5 |
| 9 | 100 | 125 | 100 | 43.5–42.5 |

*Statex 125-H (ISAF)
**Sundex 890

EXAMPLE 2

A. 85/15 Butadiene-Styrene Copolymer 50 ML 1+4/100°C.

In a continuous process operating under steady state conditions at a temperature of 55°C., the following feeds are let into the reactor:

| | | |
|---|---|---|
| 1) | Isopar C (diluent medium) | one gal./hr. |
| 2) | Butadiene | 0.85 lb./hr. |
| 3) | Styrene | 0.15 lb./hr. |
| 4) | 1,4-Dihydronaphthalene | 0.002 lb./hr. |
| 5) | Alfin catalyst (prepared as above described) | 0.18 lb./hr. |
| 6) | Nitrogen sufficient to blanket system | |

The process is operated exactly as in Example 1. The dry polymer carries 0.7 percent volatiles, 0.4 percent ash and has a Mooney viscosity ML 1+4 (100°C.) of 50 ± 2 before oil extension and a molecular weight of 300,000. Experimented data on the gum-oil blends is found in part 1 of Table IV.

B. 85/15 Butadiene-Styrene Copolymer 80 ML 1+4/100°C.

In a manner exactly similar to A above using the same flow rates, except that the molecular weight modifier was lowered to 0.001 lb. per hr., a molecular weight modified gum was isolated having a Mooney viscosity ML 1+4 (100°C.) of 80 ± 2 before oil extension and a molecular weight of 400,000. The dry polymer carries 0.5 percent volatiles and 0.4 percent ash as determined by ASTM standard test procedures.

The data obtained from these gums is to be found in part 2 of Table IV.

TABLE IV

RELATIONSHIPS OF COMPOUND MOONEY TO VARIATIONS IN CARBON AND OIL IN TREAD COMPOSITIONS ON ALFIN GUMS (BUTADIENE-STYRENE COPOLYMERS)

A. 85/15 Butadiene Styrene Copolymer 50 ML1+4(100°C.)

| | Rubber (parts) | *Carbon (parts) | **Oil (parts) | Final Mooney ML1+4/100°C. |
|---|---|---|---|---|
| 1. | 100 | 60 | 30 | 39.5–39.5 |
| 2. | 100 | 70 | 40 | 36.0–36.5 |
| 3. | 100 | 80 | 40 | 43.5–43.5 |
| 4. | 100 | 70 | 55 | 28.5–29.0 |
| 5. | 100 | 85 | 60 | 33.0–32.0 |
| 6. | 100 | 100 | 60 | 38.0–37.0 |
| 7. | 100 | 95 | 75 | 26.0–26.0 |
| 8. | 100 | 120 | 70 | 43.5–44.5 |
| 9. | 100 | 120 | 80 | 36.5–36.0 |

B. 85/15 Butadiene Styrene Copolymer 80 ML1+4 (100°C.)

| | Rubber (parts) | *Carbon (parts) | **Oil (parts) | Final Mooney ML1+4/100°C. |
|---|---|---|---|---|
| 1. | 100 | 75 | 50 | 54.5–54.5 |
| 2. | 100 | 75 | 75 | 32.0–32.5 |
| 3. | 100 | 85 | 65 | 37.5–38.0 |
| 4. | 100 | 110 | 60 | 64.5–63.5 |
| 5. | 100 | 100 | 75 | 42.0–43.0 |
| 6. | 100 | 120 | 80 | 46.5–46.0 |
| 7. | 100 | 110 | 90 | 38.0–38.5 |
| 8. | 100 | 100 | 100 | 24.0–25.0 |
| 9. | 100 | 125 | 100 | 36.0–35.0 |

\* Statex 125-17 (ISAF)
\*\* Sundex 890

EXAMPLE 3

Several of the tread compositions shown in Table IV, were tested to determine the S value computed back to standard compound (calculated S value). The procedure for determining the calculated S value is described in U.S. Pat. No. 2,964,083. The following formula was used to determine the calculated S value:

$$S = P + 100T/100$$

wherein $T$ is tensil strength for optimum cure and $P$ is "tensil product" for optimum cure as determined by the following formula:

$$P = T \times E \times A/155$$

wherein $T$ is as above, $E$ is elongation for optimum cure and $A$ is the total weight of the composition (polymer, oil and carbon black and other compounding ingredients).

The results of the tests are tabulated in Table V below.

TABLE V

| Table IV Polymer | Raw gum Mooney | Parts Oil | Parts Carbon Black | Tensil Product "P" (in thousands) | Calculated "S" Value |
|---|---|---|---|---|---|
| A-1 | 50 | 30 | 60 | 1675 | 23,700 |
| A-2 | 50 | 40 | 70 | 1710 | 26,400 |
| A-5 | 50 | 60 | 85 | 1510 | 26,600 |
| A-7 | 50 | 75 | 95 | 1320 | 25,200 |
| B-1 | 80 | 50 | 75 | 1690 | 28,200 |
| B-3 | 80 | 65 | 85 | 1870 | 33,500 |
| B-7 | 80 | 90 | 110 | 1310 | 28,400 |
| B-8 | 80 | 100 | 100 | 1720 | 35,800 |

The data in Table V shows that the calculated S value for a 50 Mooney and an 80 Mooney molecular weight controlled alfin rubber polymer remains constant or even increases when large amounts of oil are added.

EXAMPLE 4

In order to obtain a series of oil extensions of alfin gums which would be suitable for use as tire tread stock, the various rubber compounds prepared from 80/20 butadiene-isoprene and 85/15 butadiene-styrene copolymers at 50 and 80 Mooney such as those shown in Tables III and IV were prepared. Oil and carbon were added in varying amounts, the proportions being in parts by weight in each case based on 100 parts of rubber.

The oil was added in the cement stage as described in Example I. The following Banbury mixing cycle was used for the carbon black and other compounding ingredients.

Stage I

| | |
|---|---|
| Batch Factor | Full Banbury Chamber |
| Banbury Temp. | 48.9°C. |
| Rotor Speed | 88 rpm. |

| Cycle | Time |
|---|---|
| Add polymer and lower ram | 0' |
| Raise ram and add all dry ingredients and ½ carbon black | 0.5' |
| Raise ram and add remaining carbon | 2.5' |
| Raise ram and brushdown | 8.0' |
| Dump (148.9°-163°C.) | 15. |

After this preliminary mixing, the compounds were allowed to stand overnight, then "refined" starting with a cold Banbury each time for 6 minutes to a temperature of 154.4°C.

Stage II (12"Mill)

| | |
|---|---|
| Mill Roll Temperature | 87.8°C. |
| Mill Gauge | .120" for adding accelerator |
| | .050" for sheeting off |

Milling Procedure

| | Time |
|---|---|
| Band on mill | 0' |
| Add curatives and do not cut | 1' |
| Set mill gauge at .050" and cut 8 times on each side | 4' |
| Refine end over end (4–5 times) | 3' |
| Sheet off | 0' |
| Batch temperature (c. 104°C.) | |

Besides carbon, compounding ingredients added to the Banbury per 100 parts of rubber hydrocarbon were:

| | |
|---|---|
| ZnO | 5 parts |
| Stearic acid | 3 parts | vulcanizers added during the milling procedure per 100 parts of rubber hydrocarbon in the mixture were:

| | |
|---|---|
| Santocure NS | 1.4 parts |
| Sulfur | 2.2 parts |

Final carbon dispersion was checked and found to be over 96 percent particles below 9 microns particle size on all compounds.

The data in Table VI shows that tires made from both 50 Mooney and 80 Mooney molecular weight controlled alfin polymers wear considerably better than tires made from conventional SBR rubber which has a much higher Mooney, i.e., 120 or higher.

TABLE VI

Tire Test Data on Alfin Gums Compared with SBR Rubber in Tire Treads

| No. | Polymer | Tread Components (Parts) | Raw Gum Mooney | Wear Miles per .001" |
|---|---|---|---|---|
| A. | SBR 1712* | 100 SBR 1712 70 ISAF, 50 Oil | 120 | 79 |
| B. | Alfin 80/20 Butadiene-Isoprene | 100 Alfin 80/20 70 ISAF, 50 Oil | 80 | 102 |
| C. | Alfin 85/15 Butadiene-Styrene | 100 Alfin 85/15 70 ISAF, 50 Oil | 80 | 90 |
| D. | 80/20 Butadiene-Isoprene | 100 Alfin 80/20 65 HAF, 30 Oil | 50 | 124.5 |
| E. | 80/20 Butadiene-Isoprene | 100 Alfin 80/20 65 ISAF, 30 Oil | 50 | 107.5 |
| F. | 85/15 Butadiene-Styrene | 100 Alfin 85/15 60 ISAF, 37.5 Oil | 50 | 90 |
| G. | 80/20 Butadiene-Isoprene | 100 Alfin 80/20 82 ISAF, 50 Oil | 80 | 115 |

*SBR 1712 is oil extended emulsion butadiene-styrene (23%) copolymer.

EXAMPLE 5

To further demonstrate the advantages of using oil-extended, molecular weight controlled alfin polymers having a Mooney viscosity of 30–80 in tires, tire tread stocks were prepared from a 90/10 butadieneisoprene (BD/I) alfin polymer having a Mooney viscosity of 53; and 85/15 butadiene-styrene (BD/S) alfin polymer having a Mooney viscosity of 50; and a blend containing 65 percent SBR rubber having Mooney viscosity of about 130 and 30 percent of a cis-polybutadiene. The blend of SBR and cis-polybutadiene is commercially used in tire tread stocks and was used as a control in this example. The recipe used in the tire tread stocks is as follows:

| | |
|---|---|
| Oil Extended Polymer | 137.5 parts |
| ISAF Black | 75.0 |
| Oil | 12.5 |
| ZnO | 5.0 |
| Stearic Acid | 3.0 |
| Santoflex AW | 2.0 |
| Santocure NS | 1.4 |
| Sulfur | 2.3 |

The tires were subjected to wear tests by placing them on employees automobiles with no restriction on their use. Wear rates as high as 73.2 miles per mil to as low as 54 miles per mil were observed. The tests were run for 10,000 miles. The tires were also tested for traction characteristics at the Nevada Automotive Test Center. Tests included dynamic and static traction, skid resistance and braking under a variety of conditions. The results of these tests are tabulated in Table VII below:

EXAMPLE 7

In Table IX below data is presented showing the effect of adding oil and carbon black to molecular weight controlled alfin polymers and conventional SBR polymers each having Mooney viscosities of approximately 50 and 80 respectively.

TABLE IX

| | Mooney Viscosity (ML 1+4 (100°C)) | | | |
|---|---|---|---|---|
| Rubber Compound | Raw Polymer | 37.5 pts. oil/ 100 pts. rubber | 37.5 pts. oil; 50 pts. carbon black/ 100 pts. rubber | 50 pts. oil; 75 pts. carbon black/ 100 pts. rubber |
| Conventional Rubber SBR | 49.0 | 14.0 | 36 | 36 |
| Alfin Rubber | 48.5 | 19.0 | 45.5 | 44.5 |
| Conventional Rubber SBR | 77.0 | 23.0 | 50.5 | 45.0 |
| Alfin Rubber | 80.0 | 30.0 | 59.5 | 58.5 |

The data shown in Table IX clearly demonstrates that molecular weight controlled alfin polymers maintain a significantly higher Mooney viscosity when com-

TABLE VII

| | Tread Wear Index | Traction Dynamic/Static | | Braking Index | | |
|---|---|---|---|---|---|---|
| | | Dry Ice Surface | Wet Asphalt | Dry Ice | Wet Asphalt | Dry Asphalt |
| 65% SBR + 35% CIS-Polybutadiene | 100 | 100/100 | 100/100 | 100 | 100 | 100 |
| Alfin Tire 90/10 BD/I 53 Mooney | 136 | 127/112 | 110/116 | 110 | 109 | 106 |
| Alfin tire 85/15 BD/S 50 Mooney | 132 | 123/109 | 120/113 | 110 | 105 | 102 |

The results show that the molecular weight controlled alfin polymers were significantly better than the control in tread wear and skid resistance.

EXAMPLE 6

In Table VIII below, data is presented showing the relative effectiveness of various extending oils on molecular weight controlled alfin polymers. As would be expected oils vary somewhat in effectiveness because of various percentages of contained aromatic, naphthenic and paraffinic constituents. In Table VIII, an 80-20 butadiene-isoprene copolymer having a Mooney viscosity of 80 is oil extended with four different oils and two butadiene homopolymers of different Mooney viscosity are oil extended with the same extending oil.

pounded with oil and carbon black compared to conventional SBR rubbers.

EXAMPLE 8

To demonstrate the outstanding green strength of alfin rubber compositions of the present invention, several tire tread stocks were prepared from various alfin rubber polymers. SBR rubber, cis-polybutadiene and natural rubber. These various tread stocks were tested to determine their green strength. Green strength is determined by measuring the tensile strength in pounds per square inch (psi) of the various tread stocks at room temperature (25°C.) on a standard tensile tester. The results of the tests are shown in Table X wherein it will be seen that the green strength of the alfin rubber

TABLE VIII

| Oil | Rubber Compound | Raw Rubber Mooney ML 1+4 | Parts Oil per 100 parts Raw Rubber | Oil Extended Rubber Mooney ML 1+4 |
|---|---|---|---|---|
| Sundex 790 | 80-20 BD/I Copolymer | 80 | 50 | 40.5 |
| Dutrex 1726 | do. | 80 | 50 | 43.5 |
| Circosol 380 | do. | 80 | 50 | 54 |
| Sundex 890 | do. | 80 | 50 | 58 |
| Sundex 790 | Butadiene homopolymer | 37 | 37.5 | 22 |
| Sundex 790 | do. | 49 | 37.5 | 22 | compositions was much higher than that of the other synthetic rubbers and in some cases even higher than natural rubber.

TABLE X

| Rubber Polymer | Parts oil/ 100 parts polymer | Parts carbon black/ 100 parts polymer | Green Strength psi |
|---|---|---|---|
| Alfin 80/20 BD/I | 50 | 75 | 156 |
| Alfin 95/5 BD/I | 50 | 75 | 370 |
| Alfin 85/15 BD/S | 50 | 75 | 185 |
| Alfin 95/5 BD/S | 50 | 75 | 400 |
| SBR 1712 | 50 | 75 | 43 |
| Alfin 85/15 BD/S | 30 | 65 | 149 |
| Alfin 80/20 BD/I | 30 | 65 | 102 |
| SBR 1500 | 30 | 65 | 34 |
| Cis-polybutadiene | 30 | 65 | 21 |
| Natural Rubber | 30 | 65 | 116 |
| Alfin 90/10 BD/I | 80 | 120 | 170 |
| Alfin 85/15 BD/S (50 Mooney) | 80 | 120 | 90 |
| Alfin 85/15 BD/S (80 Mooney) | 80 | 120 | 100 |
| SBR 1712 | 80 | 120 | 40 |

EXAMPLE 9

A stream containing 15 parts butadiene, 2 parts isoprene, 55 parts butene-1 and butene-2 and 28 parts of saturated gases such as n-butane, propane together with small amounts of propylene and ethylene was dried by means of a molecular sieve before being passed simultaneously into a suspension of 105 parts of alfin catalyst in 660 parts of commercial hexane together with one part of styrene and 4,2 parts of 1,4-dihydrobenzene at such a rate that 30 parts per hour of butadiene, isoprene and styrene were introduced and polymerized. The reaction was continued for four hours, the polymer was worked up as above described and 110 grams of terpolymer, having a molecular weight of 170,000 was recovered. It was found that the resulting alfin terpolymer gum could readily be oil extended to give resulting gums comparable to those obtained by adding oil extenders to the copolymers and homopolymers described above.

What is claimed is:

1. A workable rubber composition having a Mooney viscosity ML1+4 (100° C.) of 24 to less than about 60 which comprises an alfin catalyzed, molecular weight controlled polymer containing a conjugated diolefin having no more than 12 carbon atoms and having a Mooney viscosity ML1+4 (100° C.) of about 30 to about 80 and a molecular weight of about 200,000 to 750,000, at least 30 parts up to 150 parts per 100 parts of said polymer of an oily liquid hydrocarbon having a boiling point above about 232° C., and from about 50 to 150 parts of carbon black per 100 parts of said polymer.

2. The composition of claim 1 wherein said polymer is a homopolymer of butadiene.

3. The composition of claim 1 wherein said polymer is a homopolymer of isoprene.

4. The composition of claim 1 wherein said polymer is a butadieneisoprene copolymer having at least 50 percent by weight of butadiene.

5. The composition of claim 1 wherein said polymer is a copolymer of butadiene-styrene having at least 50 percent by weight of butadiene.

6. The composition of claim 1 wherein said carbon black is high abrasion furnace carbon black.

7. The composition of claim 1 wherein said carbon black is intermediate super abrasion furnace carbon black.

8. The composition of claim 1 wherein said oil is up to about 100 parts per 100 parts of said polymer.

9. The composition of claim 8 wherein said amount of said carbon black is about 30 – 65 percent based on the total amount of oil and polymer.

10. The composition of claim 9 wherein said carbon black is about 35 – 60 percent.

11. The composition of claim 1 wherein said oil has a boiling point above about 288° C.

* * * * *